United States Patent [19]

Naddor et al.

[11] Patent Number: 5,157,716
[45] Date of Patent: Oct. 20, 1992

[54] DYNAMIC CALLBACK TECHNIQUE

[75] Inventors: David J. Naddor, Doraville; Randolph J. Schaubs, Stone Mountain, both of Ga.

[73] Assignee: Scientific-Atlanta, Inc., Norcross, Ga.

[21] Appl. No.: 567,612

[22] Filed: Aug. 15, 1990

Related U.S. Application Data

[62] Division of Ser. No. 186,908, Apr. 27, 1988, Pat. No. 5,012,510.

[51] Int. Cl.$^5$ ................. H04M 11/00; H04N 17/00
[52] U.S. Cl. .................. 379/92; 379/105; 379/106; 358/86; 340/825.08
[58] Field of Search .......... 379/92, 106, 107, 105; 358/84, 86; 455/2; 340/825.5, 825.07, 825.08; 370/79, 83, 90, 96

[56] References Cited

U.S. PATENT DOCUMENTS

| | | |
|---|---|---|
| 3,777,278 | 12/1973 | Majeau et al. |
| 3,878,322 | 4/1975 | Sullivan |
| 3,878,512 | 4/1975 | Kobayashi et al. |
| 3,944,742 | 3/1976 | Cunningham |
| 4,063,220 | 12/1977 | Metcalfe et al. |
| 4,071,908 | 1/1978 | Brophy et al. |
| 4,104,486 | 8/1978 | Martin et al. |
| 4,241,237 | 12/1980 | Paraskevakos et al. |
| 4,241,410 | 12/1980 | DePuy |
| 4,325,078 | 4/1982 | Seaton et al. |
| 4,361,851 | 11/1982 | Asip et al. |
| 4,365,145 | 12/1982 | Frentress |
| 4,398,289 | 8/1983 | Schoute ................. 370/93 |
| 4,409,592 | 10/1983 | Hunt |
| 4,455,453 | 6/1984 | Paraskevakos et al. |
| 4,528,663 | 7/1985 | Citta |
| 4,536,791 | 8/1985 | Campbell et al. |
| 4,546,382 | 10/1985 | McKenna et al. |
| 4,558,464 | 12/1985 | O'Brien, Jr. |
| 4,573,045 | 2/1986 | Galin |
| 4,578,700 | 3/1986 | Roberts et al. |
| 4,584,602 | 4/1986 | Nakagawa |
| 4,630,108 | 12/1986 | Gomersall |
| 4,633,442 | 12/1986 | Stifle et al. ................. 370/93 |
| 4,667,191 | 5/1987 | Comroe et al. |
| 4,679,192 | 7/1987 | Vanbrabant |
| 4,689,619 | 8/1987 | O'Brien, Jr. |
| 4,696,029 | 9/1987 | Cohen |
| 4,710,955 | 12/1987 | Kauffman |
| 4,737,783 | 4/1988 | Tanaka et al. |
| 4,755,872 | 7/1988 | Bestler et al. |
| 4,763,191 | 8/1988 | Gordon et al. |
| 4,893,248 | 1/1990 | Pitts et al. ................. 358/84 |

FOREIGN PATENT DOCUMENTS

| | | |
|---|---|---|
| WO85/03830 | 8/1985 | PCT Int'l Appl. |
| 8000209 | 2/1980 | World Int. Prop. O. ............ 358/84 |

OTHER PUBLICATIONS

IEEE, Whatever Happened to Two-Way Interactive Cable TV (May 1988).

*Primary Examiner*—James L. Dwyer
*Assistant Examiner*—Wing F. Chan
*Attorney, Agent, or Firm*—William A. Marvin

[57] ABSTRACT

A dynamic global callback technique which is capable of maintaining a manageable number of incoming calls to a central location from a plurality of remote units. A plurality of remote units are prompted to initiate callback attempts to a central location during a given callback period. The number of successful callback attempts from the remote units to the central location is monitored. The callback period if dynamically adjusted so as to cause the monitored number of successful callback attempts to approximately equal the number of successful callback attempts capable of being handled by the central location without overloading the telephone network.

46 Claims, 4 Drawing Sheets

DYNAMIC CALLBACK TECHNIQUE

This application is a divisional application of commonly assigned Ser. No. 186,908, now U.S. Pat. No. 5,012,510 entitled "Dynamic Callback Technique" filed Apr. 27, 1988 and issued to Schuabs, et al. on Apr. 30, 1991. The disclosure of Schuabs, et al. is hereby incorporated herein by reference.

BACKGROUND OF THE INVENTION

This invention generally relates to a remote monitoring system and, more particularly, to a dynamic callback technique which minimizes the amount of time required to obtain stored information from a plurality of remote units without exceeding the capacity of the telephone network.

U.S. Pat. Nos. 4,241,237 and 4,455,453 to Paraskevakos et al. disclose remote meter reading systems where each of a number of remote units initiate callback at predetermined intervals to a central facility for billing and monitoring purposes. A central complex provides a digital instruction to each remote unit upon the completion of its data transfer. The instruction includes data to control the next scheduled callback time. Such a system cannot, however, be used to dynamically control a callback in response to the incoming rate of calls.

U.S. Pat. No. 4,584,602 to Nakagawa discloses a data collecting system and method which are capable of collecting television audience rating data. A marker signal initiates the callback and, after waiting a predetermined time necessary for other terminal units to transmit their data, each terminal unit automatically dials a predetermined telephone number in order to transmit requested viewing data. Such a system may prove useful where a known number of terminals are calling in, but does not promote an efficient use of phone lines where it is not necessary for each terminal to call in.

U.S. Pat. No. 4,696,029 to Cohen controls the initiation of voting calls through regulation of the visual stimuli which trigger the calls. A control center monitors polling call traffic at a plurality of central offices until it determines that the traffic being generated has reached a level which is not within the traffic-handling capabilities of the central office switching machines. The control center then sends messages which cause character generators at local affiliates to reduce the frequency and/or duration of the visual stimuli until the traffic generated has dropped to a level which is within the traffic handling capabilities of the central office. However, this technique cannot be used where the generation of data cannot be controlled.

In order to appreciate the problem solved by the present invention, it is important to understand at least an overview of the problem of connecting a subscriber by telephone through the telephone network to a cable television headend. By way of example, the subscriber may be assumed to have an ordinary telephone set and be located in a different telephone exchange (central office) area from the telephone exchange serving a private branch exchange located at the cable television headend. In particular, when a subscriber initiates a call, the dial tone serving and switching capacity of the initial telephone exchange, the capacity of trunks connecting the two telephone exchanges, the capacity of the lines serving the private branch exchange, the switching capacity of the private branch exchange, and the busy status of the extensions at the private branch exchange are all factors involved in determining whether two different subscribers associated with a cable television headend are able to achieve a through connection to the headend at the same time. The difficulties in establishing a telephone connection when a large number of remote units are attempting to call the headend are magnified when subscribers, especially those who are located in a small geographic area and would tend to connect to the headend over similar telephone paths, all call in simultaneously.

SUMMARY OF THE INVENTION

Accordingly, it is an object of the present invention to provide an efficient method for retrieving data from a plurality of remote units.

It is another object of the present invention to provide a method of dynamically controlling the callback of stored data to a central location from a plurality of remote units.

In accordance with these and other objects, the present invention provides a method of dynamically controlling the callback of stored data from a plurality of remote units to a central location over a telephone network. A plurality of remote units are prompted to initiate callback attempts to a central location at some moment during a callback period, the callback period having a predetermined duration. The number of successful callback attempts from the remote units to the central location is monitored. The callback period is dynamically adjusted so as to cause the monitored number of successful callback attempts to approximately equal the number of successful callback attempts capable of being handled by the central location without overloading the telephone network.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENT

The present invention will be explained with regard to a cable television system, particularly a cable television system with impulse pay-per-view capability. It should be understood that the invention should not be construed as limited to this particular system, but should be broadly read to encompass any system in which data recovery must be effected from a plurality of remote units.

Figure 1:
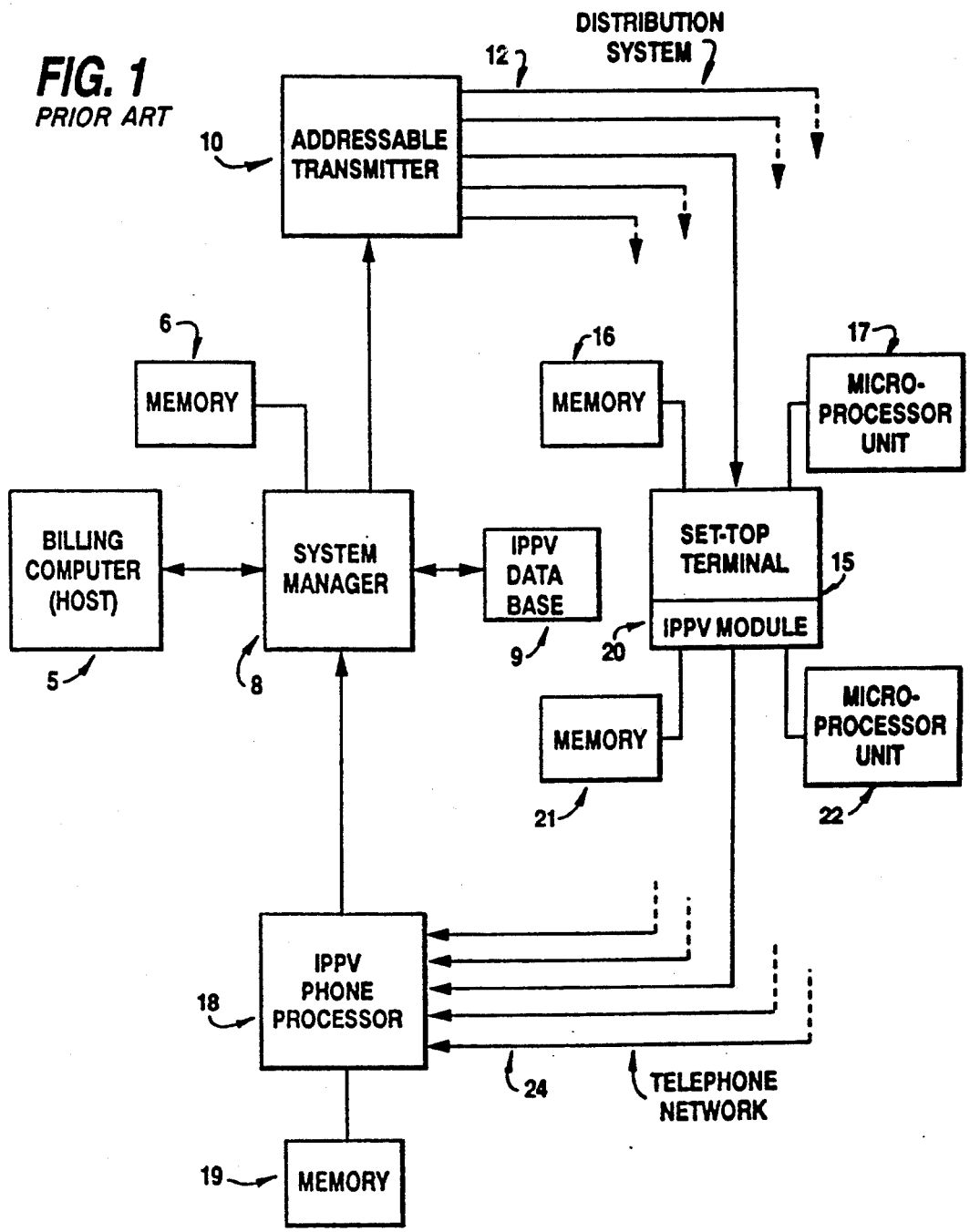
FIG. 1 is a block diagram representing the overall configuration of an impulse pay-per-view system.

A typical impulse pay-per-view system is shown in FIG. 1. The system includes a billing computer or host 5 which comprises an essential part of a cable system having impulse pay-per-view capability. Billing computer 5 records and maintains records for each cable subscriber. These records may contain information such as the subscriber's name, address and telephone number, the type of equipment the subscriber has in his possession, and which pay services the subscriber is authorized to view. Typically, the cable operator owns the billing computer, leases the equipment from a vendor who specializes in this type of equipment, or shares computer time on a machine owned by one of these billing vendors.

Billing computer 5 is interfaced to a system manager 8 having an associated memory 6. System manager 8 controls the cable system. Typically located at or near the billing computer 5, system manager 8 maintains a list of all the addressable set-top terminals in the cable system as well as those services which each terminal is authorized to receive. System manager 8 also defines and maintains the parameters selected by the cable operator for each system. These parameters may include the frequencies associated with each channel in the system, which channels are being scrambled, the security features of the system, and the system time. Additionally, system manager 8 is responsible for the authorization and deauthorization of pay-per-view events in the system.

A computer of system manager 8 will have a disk and controller dedicated to the storage of IPPV information. A memory resident program of system manager 8 will read the IPPV transactions, uploaded from the IPPV modules in the system. Each IPPV transaction will be stored in data base 9 until it is retrieved by billing computer 5. An operator of the system manager will have the ability to access the IPPV data base 9 and display the event identifiers (IDs) of the events that have been purchased by a converter. The data returned to the billing computer will be grouped by the identification of a particular set-top terminal or converter, that is, all event IDs associated with a particular converter serial number will be returned together. Finally, the system manager may prompt the converters to transmit billing information related to IPPV purchases over telephone network 24 by downloading a transaction to addressable transmitter 10.

The addressable transmitter 10 is a device used to receive commands generated by system manager 8 and transmit them on a dedicated data channel in the cable system in format recognizable by the addressable set-top terminals. Typically, one addressable transmitter is located at each cable headend. Addressable transmitter 10 will receive IPPV transactions from system manager 8 and format the appropriate commands for transmission to the IPPV equipped converters. In the alternative, an addressable in-band signalling controller (not shown) may be used to accomplish transactions related to a particular subscriber.

Each subscriber in the addressable cable system is provided with a set-top terminal 15 by the cable operator as schematically indicated in FIG. 1. Set-top terminal 15 allows the subscriber to tune and descramble the services that he has requested from the cable system operator. Each set-top terminal includes a memory 16 and a microprocessor unit 17. Each set-top terminal 15 contains a unique identifier, or address, for example, a manufacturer's serial number, which allows the cable operator to send commands via addressable transmitter 10 to an individual set-top terminal. These commands are called "addressable" commands. The set-top terminals are also capable of receiving "global" commands heard by all the set-top terminals in a cable system. Those subscribers who are authorized to purchase impulse pay-per-view events are issued set-top terminals which have been equipped with an IPPV module 20. Module 20 allows the subscriber to authorize his set-top terminal to receive a pay-per-view event, store the data associated with the purchase of the event in memory 21, and transmit that stored data to the cable operator via the telephone network 24. The subscriber is then billed for the events that he has purchased. IPPV module 20 receives the IPPV transactions from addressable transmitter 10 via distribution system 12 and stores the IPPV parameters in nonvolatile memory (NVM 21). Each IPPV module 20 includes a microprocessor unit 22. The IPPV module also functions to authorize IPPV events and record IPPV activity in the NVM 21. Module 20 transfers IPPV data to the system manager 8 via phone processor 18 by dialing a phone number stored in memory 21 in response to instructions from system manager 8 when a callback command is received. Upon successful transmission, the IPPV module will clear the purchase data maintained in NVM 21.

Generally, three types of callbacks may be implemented in an impulse pay-per-view system. A global callback requires every remote unit in the system to call back. A second type of callback requires only those remote units to call back that have purchased a particular event. For instance, only those units which purchased a particular impulse pay-per-view event may be required to call back. Finally, a remote unit may be instructed to call back if any event has been purchased. Each of these callbacks may be done periodically, for instance, once a day.

Problems may arise, particularly during a global callback, if each remote unit attempts to call back at the same time. The present invention concerns a method of spacing the calls from the remote units such that a manageable volume of incoming calls to the phone processor is generated without overloading any telephone exchange, especially the private branch exchange of the headend. The method may be said to optimize the use of the phone system.

For a global callback, the system manager may determine how many units should call in, although the actual number will vary according to subscriber phone use, broken phone lines, and subscriber tampering. As in the prior art, it may be possible for the system manager to set-up a predetermined callback sequence or download a particular callback time to the various remote units, but these systems become burdensome in large systems where remote units are constantly being added or removed. The situation becomes increasingly untractable where the callback involves only those who have purchased a particular event, or alternatively, those who have purchased any event. In such instances, the system manager does not know how many remote units will call back. Without this knowledge, the system manager may initiate a callback which either overloads or underloads the phone exchange.

The method of dynamic callback basically involves the monitoring of the phone lines during a callback. If there is significant "dead time" on the lines, the remote units are instructed to call back faster. If the lines are operating at full capacity, the remote units may be instructed to call back slower. Such a system results in more efficient callbacks in which the total time necessary for all the remote units to successfully callback is actually a function of the total number of units which must call back, rather than a function of how well the system operator is able to estimate how many remote units will call back. The result is a highly efficient use of the system components.

Figure 4:
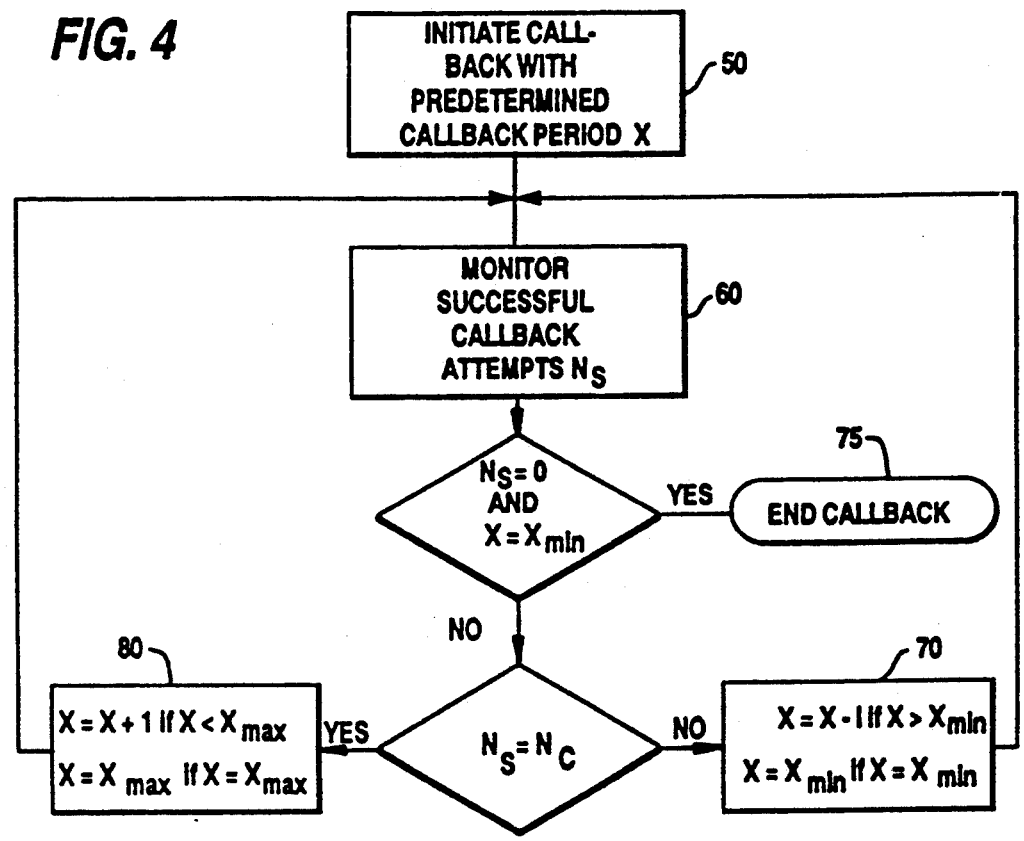
FIG. 4 is a flowchart illustrating dynamic callback according to a method of the present invention.

The method of dynamic callback may be summarized as follows with reference to FIG. 4. In the step indicated by block 50, the system manager initiates a callback and fixes a callback period X, i.e. a period during which each remote unit involved in the callback will attempt to call back. This initial callback period is determined using the system operator's best estimate of how many units will call back. Each remote unit will then call back at a random moment during the callback period, the random moment generated by an algorithm described below. If the remote unit successfully calls in to the phone processor, the remote unit transfers the requested data. If the remote unit is unsuccessful, it will wait for a time exactly equal to the callback period and try again. The system manager continuously monitors the number of successful calls $N_S$ to the phone processor as indicated in step 60. The number of calls completed to the phone processor will be referred to below as "successful callback rate" or simply "callback rate". The phone processor is capable of handling calls coming in at a rate $N_c$. If the number of successful calls $N_S=0$, and the remote units are calling back at their maximum rate determined by $X_{min}$, the callback is ended, as designated by box 75. As detailed below, if the callback rate is too slow ($N_S<N_c$), control passes to box 70 whereby the system manager reduces the amount of time the remote units will wait between unsuccessful callback attempts so as to speed up the callback rate $N_S$. If the remote units are already calling back at their maximum or fastest rate (i.e. $X=X_{min}$), this rate is maintained. If the callback rate is such that the phone processor is operating at capacity ($N_S=N_c$), it may be that the telephone exchange is overloaded. Control passes to box 80 whereby the system manager increases the amount of time the remote units will wait between unsuccessful callback attempts so as to slow down the callback rate. If the remote units are already calling back at their minimum or slowest rate (i.e. $X=X_{max}$), this rate is maintained.

Figure 5:
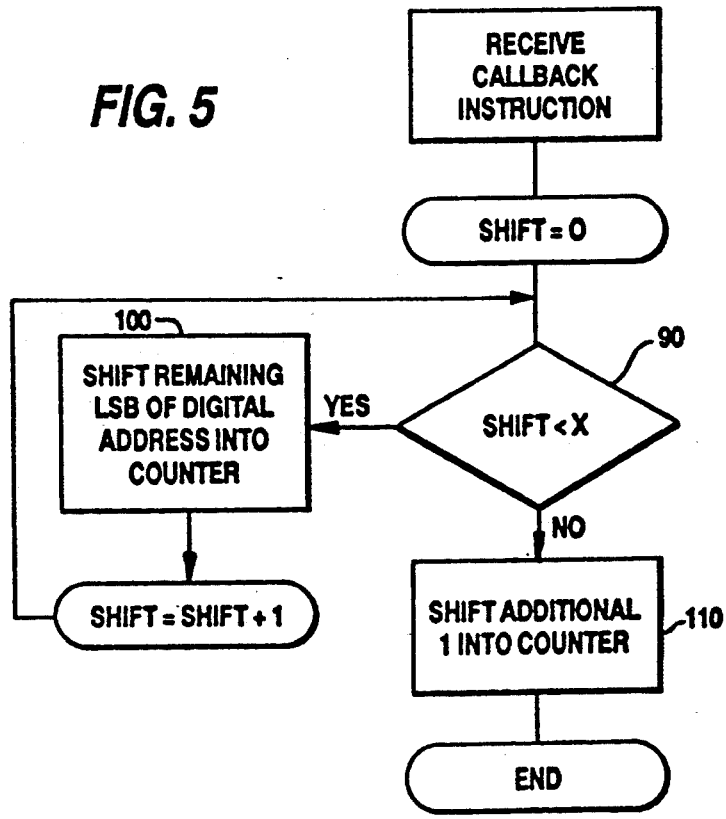
FIG. 5 is a flowchart illustrating the loading of a counter according to a method of the present invention.

The digital address of the remote unit may be used to generate the first time at which a remote unit will attempt to callback according to a method outlined in FIG. 5. In order to avoid the problem detailed above of having sequentially addressed converters in a small geographic region calling back at the same time, an algorithm which reverses the bit order of the digital address is used to generate this first callback time. For example, suppose the digital address is 1234567. The least significant digit in this address is 7. The algorithm of the present invention makes this the most significant digit in terms of determining how long the module will wait to call back. Upon receipt of the callback instruction containing the callback parameter X, this parameter is compared with a shift value which indicates how many bits of the digital address have been shifted into the counter, schematically indicated in box 90. If the shift value is less than the callback parameter, the remaining least significant bit of the digital address which has not yet been shifted into the counter, is shifted in as indicated in box 100. This continues until the shift value is equal to the callback parameter, when an additional 1 is shifted into the counter, as indicated in box 110.

Figure 2:
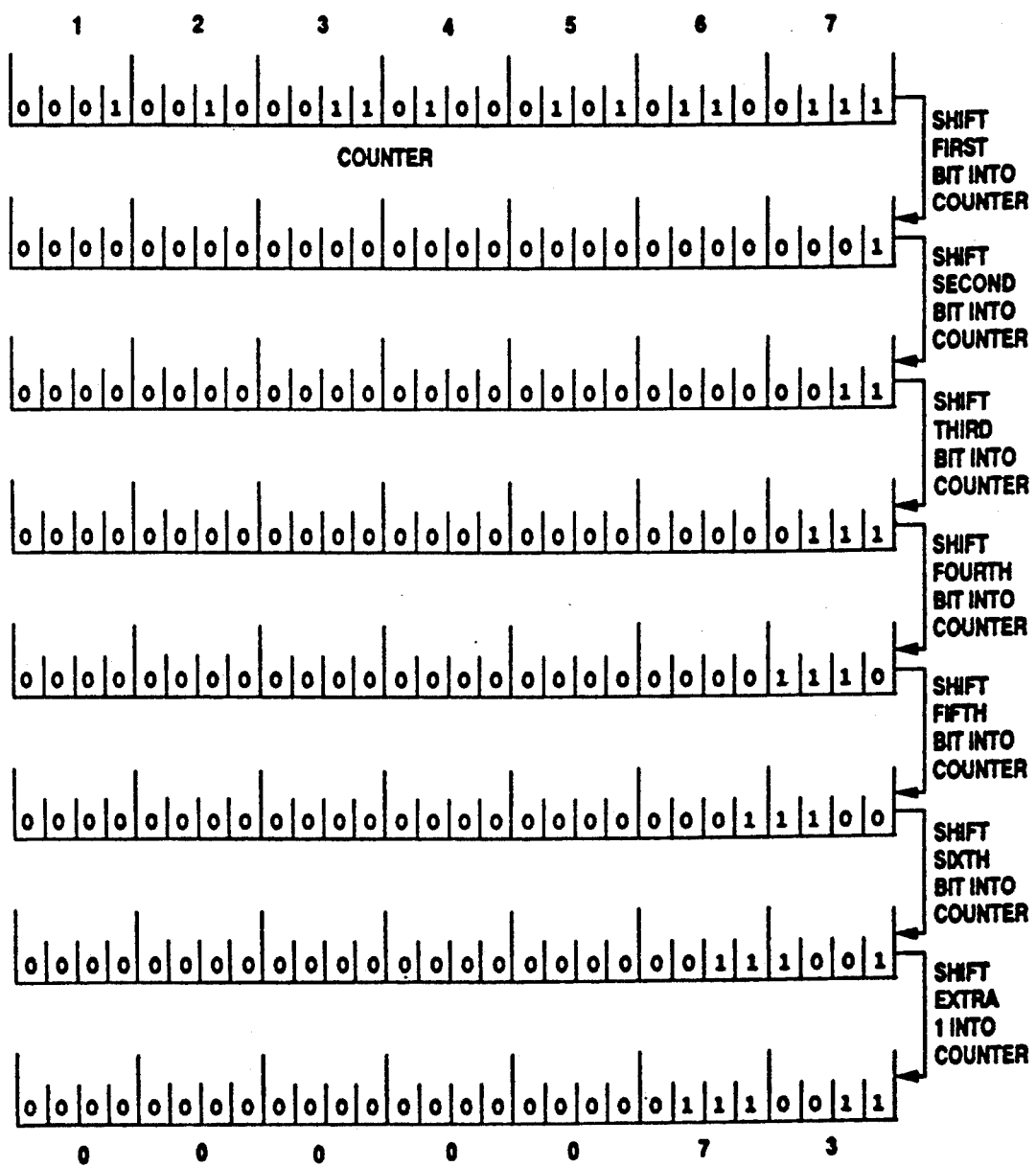
FIG. 2 is a schematic diagram illustrating the loading of a counter in accordance with the present invention.

One embodiment of the present invention will be described through the use of FIG. 2 and Table 1.

TABLE 1

| X | CALLBACK |
|---|---|
| 0 | 00:00:05 |
| 1 | 00:00:10 |
| 2 | 00:00:20 |
| 3 | 00:00:40 |
| 4 | 00:01:20 |
| 5 | 00:02:40 |
| 6 | 00:05:20 |
| 7 | 00:10:40 |
| 8 | 00:21:20 |
| 9 | 00:42:40 |
| A | 01:25:20 |
| B | 02:50:40 |
| C | 05:41:20 |
| D | 11:22:40 |
| E | 22:45:20 |
| F | 45:30:40 |

Callback parameter X controls the rate at which the remote units attempt to call the headend. At maximum speed (X=0), each remote unit tries to call every 5 seconds. At minimum speed (X=F), each remote unit tries to call approximately every 2 days (45:30:40). It should be noted that the times and callback parameters contained in Table 1 are illustrative of one embodiment and the invention should not be understood as limited in this respect. The callback times and associated parameters may be configured so as to be applied to a wide variety of situations in accordance with the number of remote units, the maximum and minimum times desired for the callback period, etc. Finally, although the embodiment of Table 1 discloses adjacent callback periods which differ by a factor of two, the factor of two merely simplifies implementation in a preferred embodiment and is not critical to the practicing of the invention. Thus, adjacent callback periods may also differ some constant value, for example, one minute.

The remote unit uses a preloaded identifier, such as a digital address, to determine how long to wait before initiating the first call. In the embodiment of Table 1, this random interval generated as described below is always a multiple of 5 seconds, and is no greater than the callback period as determined by the parameter X.

During a callback, the system manager periodically polls the phone processor to determine if a faster or slower callback rate is required. If necessary, a transaction is sent to the remote units via addressable transmitter 10 which adjusts the callback rate. The system manager may make an intelligent guess at the optimum callback rate based on the type of callback requested. For example, if viewing channel statistics are requested, every module will call back, and a slow rate is needed. If only those modules which purchased a particular event are requested, a much faster rate can be used. During callback, the callback rate is monitored by the system manager and the initial guess may be continually modified to the extent necessary to produce optimum utilization of the telephone system. Thus, based on the number of calls completed to phone processor 18, the callback parameter X may be continually adjusted. If the phone processor may process more calls than are being received at a given moment, the system manager may change the callback parameter to decrease the amount of time a remote unit will wait between callback attempts. If the phone processor is operating at capacity at a given moment, the system manager may change the callback parameter to increase the amount of time a remote unit will wait between callback attempts. If the phone processor is still operating at capacity, the callback period may be increased further still. When the callback period has been increased such that the phone processor is operating slightly below capacity, the callback parameter may be switched repeatedly between that value and the value which will produce the next longest callback period. When the phone processor again begins to operate below capacity, the callback parameter is adjusted accordingly. This process is the essence of the dynamic feature of the present invention.

A specific example will now be detailed with reference to FIG. 2. In order to effect a callback in the embodiment of Table 1, a 16-bit counter in each subscriber module, is decremented every 2.5 seconds. Those of ordinary skill will appreciate that other counters may be used in accordance with the requirements of a particular system. When a counter decrements below zero, the associated remote unit attempts to call back. The initial value of the counter is determined by shifting a preloaded identifier in reverse bit order, such as the digital address of the remote unit, by the number of bits specified by callback parameter X, and then shifting in a 1. The shifting in of the 1 is not a critical feature of the present invention and is done to prevent a remote unit in the present embodiment from calling back at 2.5, 7.5, 12.5 seconds etc. The important feature is that the counter is loaded by shifting the digital address of the remote unit into the counter backwards. Suppose, for example, the digital address of the module is 1234567 and X=6. FIG. 2 shows this digital address and the binary representation of each digit in the address immediately therebelow. The shifting of the bits in this binary representation in accordance with the callback parameter X determines how the counter is loaded. The shifting of these bits and the subsequent shifting in of a 1 is also indicated in FIG. 2. Thus, in this example, module 1234567 will call back after (73 h+1)×2.5 seconds or 4 minutes and 50 seconds, where h is used to indicate hexadecimal notation.

Figure 3:
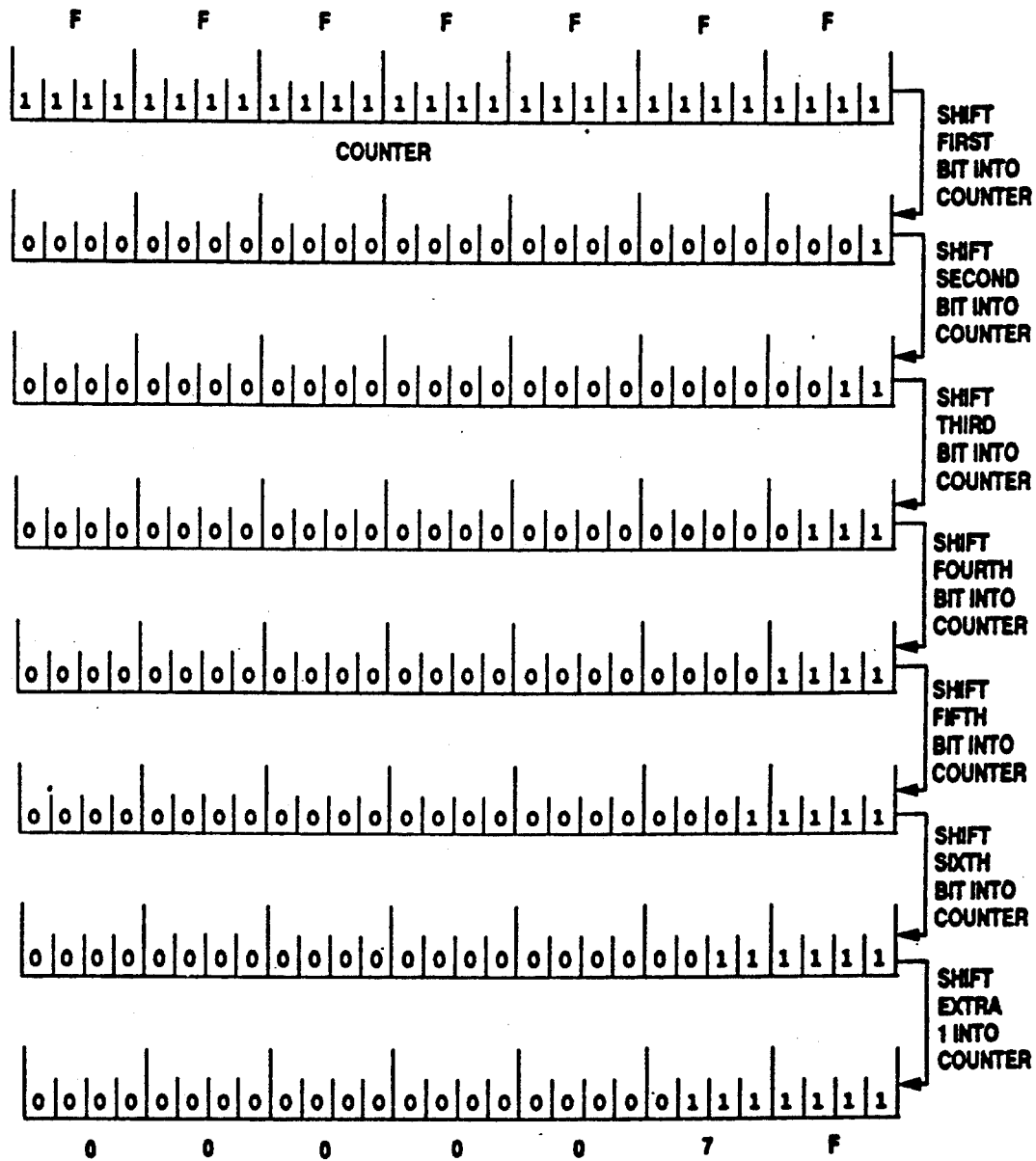
FIG. 3 is a schematic diagram illustrating the loading of a counter in accordance with the present invention.

If the remote unit attempts to callback but is unsuccessful, the counter is reloaded according to same method as previously described, but a digital address of FFFFFFF is used as shown in FIG. 3. The remote unit will thus try again after (7F h+1)×2.5 seconds, or 5 minutes and 20 seconds. The effect of using FFFFFFF as the digital address is to have the remote unit call back after a time period equal to that determined by the callback parameter. The loading of this particular address is not critical to a general implementation of this invention, but in a preferred embodiment for use in an impulse pay-pay-view system, this address serves to load the counter with the value of the callback period.

Thus, after an unsuccessful first callback attempt at the moment generated as described above, the remote unit will wait for a time period equal to the callback period before attempting its next callback. In short, the critical feature is not the address value FFFFFFF, but rather the loading of callback period into the counter after an unsuccessful callback attempt. This is an important feature of the invention since such a procedure will maintain an initial uniform distribution over time.

When the callback is initiated and a callback parameter value is chosen, each module generates a random time value between 0 and the callback period determined by the choice of X. This random time value is how long the module will wait before first calling back. The method outlined above will produce a uniform distribution of calls during the initial callback period. If a module cannot get through to the phone processor, it will wait for a time exactly equal to the callback period before calling back. Such a procedure will maintain a uniform distribution.

If during callback, the system manager determines that the callback rate is too fast or too slow, the rate may be adjusted by sending a transaction to either slow the rate down or speed it up, respectively. When the callback rate changes, the module must shift its counter left (if X increases) or right (if X decreases). It must also record in memory the new value of X for future reference.

It is very important that the least significant bit in the digital address become the most significant bit in the counter as in the method outlined above. This causes sequential converters to call back at widely spaced intervals. Since nearly all converters are sold in sequential sets, this mechanism is essential to the success of the dynamic callback since it will prevent remote units which would use the same telephone path to the headend from calling back at the same time.

For example, suppose the population of remote units consists of remote units XXXXX00 to XXXXX0F, where X may denote any value. With a callback value of X=4, the converters callback as shown in Table 2 in accordance with the algorithm described above.

TABLE 2

| ELAPSED TIME | DIGITAL ADDRESS |
| --- | --- |
| 00:00:05 | X X X X X X [0] |
| 00:00:10 | X X X X X X [8] |
| 00:00:15 | X X X X X X [4] |
| 00:00:20 | X X X X X X [C] |
| 00:00:25 | X X X X X X [2] |
| 00:00:30 | X X X X X X [A] |
| 00:00:35 | X X X X X X [6] |
| 00:00:40 | X X X X X X [E] |
| 00:00:45 | X X X X X X [1] |
| 00:00:50 | X X X X X X [9] |
| 00:00:55 | X X X X X X [5] |
| 00:01:00 | X X X X X X [D] |
| 00:01:05 | X X X X X X [3] |
| 00:01:10 | X X X X X X [B] |
| 00:01:15 | X X X X X X [7] |
| 00:01:20 | X X X X X X [F] |
| 00:01:25 | X X X X X X [0] (retry) |
| 00:01:30 | X X X X X X [8] (retry) |

Table 2 shows that any remote unit having a digital address ending in 0 will call back after 5 seconds, any remote unit having a digital address ending in 8 will call back after 10 seconds, etc. Thus it can be seen that sequential converters will call at spaced intervals.

Table 3 illustrates what would happen if a callback parameter X=3 were used instead of X=4.

TABLE 3

| ELAPSED TIME | DIGITAL ADDRESS |
| --- | --- |
| 00:00:05 | X X X X X X [0,8] |
| 00:00:10 | X X X X X X [4,C] |
| 00:00:15 | X X X X X X [2,6] |
| 00:00:20 | X X X X X X [A,E] |
| 00:00:25 | X X X X X X [1,9] |
| 00:00:30 | X X X X X X [5,D] |
| 00:00:35 | X X X X X X [3,B] |
| 00:00:40 | X X X X X X [7,F] |
| 00:00:45 | X X X X X X [0,8] (retry) |
| 00:00:50 | X X X X X X [4,C] (retry) |

A comparison of Table 2 with Table 3 demonstrates the effect of choosing a shorter callback period. It can be seen that with X=3 remote units whose addresses end in either 0 or 8 will attempt to call in after 00:00:05 have elapsed. Likewise, remote units whose addresses end in either 4 or C will attempt to call in after 00:00:10 have elapsed. Thus, twice as many converters will attempt to call back at a given time when X=3 than will attempt to call back at a given time when X=4. It can be seen that use of a callback parameter of X=3 essentially forces converters that would call back at adjacent time periods if X=4 to call back at the same time.

Table 4 illustrates the effect of choosing a callback parameter of X=5.

TABLE 4

| ELAPSED TIME | DIGITAL ADDRESS |
| --- | --- |
| 00:00:05 | X X X X X [0,8,4,C,2,A,6,E] 0 |
| 00:00:10 | X X X X X [1,9,5,D,3,B,7,F] 0 |
| 00:00:15 | X X X X X [0,8,4,C,2,A,6,3] 8 |
| 00:00:20 | X X X X X [1,9,5,D,3,B,7,F] 8 |
| 00:00:25 | X X X X X [0,8,4,C,2,A,6,E] 4 |
| 00:00:30 | X X X X X [1,9,5,D,3,B,7,F] 4 |
| 00:00:35 | X X X X X [0,8,4,C,2,A,6,E] C |
| 00:00:40 | X X X X X [1,9,5,D,3,B,7,F] C |

A comparison of Table 3 with Table 4 demonstrates the effect of choosing a longer callback period. It can be seen that with X=5, remote units whose second to last address bit is 0,8,4C,2,A,6, or E and whose last address bit is 0 will attempt to callback after 00:00:05 have elapsed. Likewise, converters whose second to last address bit is 1,9,5D,3,B,7 or F and whose last address bit is 0 will attempt to callback after 00:00:10 have elapsed. Thus, half as many converters will attempt to call back at a given time at a given time when X=5 than will attempt to call back when X=4. It can be seen that use of a callback parameter of X=5 essentially splits up converters that would callback at the same time into two equal groups that will callback at adjacent times.

An example may also be used to explain how a callback operates. Suppose the population of remote units have addresses:

100, 101, 102, 103, 104, 105, 201, 203.

The operation will be explained with reference to Table 2. If we start a callback at 00:00:00, at time 00:00:05, any remote unit whose digital address ends with 0 will attempt to call in. At 00:00:10 any remote unit whose digital address ends with 8 will attempt to call back. Finally, at 00:01:20, any remote unit whose address ends in F will attempt to call back. Note that at t=00:01:25, any remote unit whose address ends in 0 will attempt to call in a second time. This "retry" takes place exactly 00:01:20 after the initial attempt or after a period of time equal to the callback period determined by X. With regard to our sample population of remote units, the population will call back as indicated in Table 5.

TABLE 5

| CONVERTER ADDRESS | CALLBACK TIME |
| --- | --- |
| 100 | 00:00:05 |
| 101 | 00:00:45 |
| 102 | 00:00:25 |
| 103 | 00:01:05 |
| 104 | 00:00:15 |
| 105 | 00:00:55 |
| 201 | 00:00:45 |
| 203 | 00:01:05 |

Thus, it can be seen that the converters having addresses 101 and 201 will attempt to call at the same time and the converters having addresses 103 and 203 will attempt to call at the same time. Assume that converter 101 successfully calls in at 00:00:45, but converter 201 is unsuccessful. Converter 201 will not attempt to callback until t=00:02:05 or until a period of time equal to the callback period has elapsed. Thus, it will not interfere with converters having a digital address that does not end in 1.

The system manager controlling the callback may decide for our sample population that a callback period of 00:01:20 is too slow and that the phone processor is capable of handling more calls. The system manager can decide to set the callback parameter to X=3 to establish a callback period of 40 seconds. This parameter will serve to halve the remaining time on the counters in each of the remote units so that the units will attempt to callback every 40 seconds rather than every 1 minute 20 seconds. For example, if the module is waiting 00:01:20 or 80 seconds to call in and after 00:01:00 or 60 seconds, it receives a command to halve its callback period to 40 seconds, it will wait an additional (80−60)/2=10 seconds to call in rather than the 20 seconds originally remaining. If the remote unit calls back unsuccessfully, as detailed above, the counter is loaded in accordance with the disclosed algorithm using address FFFFFFF. When X=4, shifting the bits into the counter as shown will load the counter with 1 minute 20 seconds. However, when the parameter X is changed to 3, the counter is loaded with 40 seconds.

If the system manager were to determine during the monitoring of the callback that a callback rate of 00:01:20 was causing the phone processor to operate at its capacity, it may wish to slow down the callback rate to ensure that the phone network was not being overloaded. Thus, the system manager may change the callback parameter from X=4 to X=5. This change will establish a callback period of 00:02:40. The remaining time on the counters in each of the remote units will be doubled. For example, if the module is waiting 00:01:20 or 80 seconds to call in and after 00:01:00 or 60 seconds, it receives a command to double its callback period to 00:02:40, it will wait an additional (80−60)×2=40 seconds to call in, rather than the 20 seconds originally remaining.

When the callback parameter is increased or decreased by 1, the effect is either to halve or double, respectively, the number of calls to the phone processor. As seen above, doubling the number of calls by decreasing the callback parameter will cause remote units that would have called back in adjacent time intervals to call back at the same time. Subsequently halving the number of remote units that call back will split the remote units calling in at the same time into 2 groups, although these groups will not necessarily be the original groups. For instance, with reference to Tables 2 and 3, it can be seen that with X=4, remote units whose addresses end in 0 and 8 will call in at 00:00:05 and 00:00:10, respectively. Halving the callback period will cause the remote units whose addresses end in 0 or 8 to call in at 00:00:05. Subsequently, doubling the callback period will not necessarily break this group neatly back into 2 groups, one of which comprises addresses that end in 0 and one which comprises addresses ending in 8. This is essentially due to the effects of halving and doubling the counts on a counter and is not a critical feature of the present invention. What is critical is that the changing of parameters will either double or halve the number of calls from the remote units to the phone processor.

While the foregoing description is directed to a presently preferred embodiment, it will be obvious to one of ordinary skill that various modifications may be made without departing from the true spirit or scope of the invention which is to be limited only by the appended claims.

APPENDIX

This Appendix sets forth the callback times for remote units based on their digital addresses for callback parameters X=0 to X=F. The Appendix illustrates how the choice of callback parameter determines which remote units will call in at a given time.

X represents any bit value.

| ELAPSED TIME | DIGITAL ADDRESS |
|---|---|
| | X=0 |
| 00:00:05 | X X X X X X X |
| 00:00:10 | X X X X X X X (retry) |
| 00:00:15 | X X X X X X X (retry) |
| | X=1 |
| 00:00:05 | X X X X X X [0,8,4,C,2,A,6,E] |
| 00:00:10 | X X X X X X [1,9,5,D,3,B,7,F] |
| 00:00:15 | X X X X X X [0,8,4,C,2,A,6,E] (retry) |
| 00:00:20 | X X X X X X [1,9,5,D,3,B,7,E] (retry) |
| | X=2 |
| 00:00:05 | X X X X X X [0,8,4,C] |
| 00:00:10 | X X X X X X [2,6,A,E] |
| 00:00:15 | X X X X X X [1,9,5,D] |
| 00:00:20 | X X X X X X [3,B,7,F] |
| 00:00:25 | X X X X X X [0,8,4,C] (retry) |
| 00:00:30 | X X X X X X [2,6,A,E] (retry) |
| | X=3 |
| 00:00:05 | X X X X X X [0,8] |
| 00:00:10 | X X X X X X [4,C] |
| 00:00:15 | X X X X X X [2,6] |
| 00:00:20 | X X X X X X [A,E] |
| 00:00:25 | X X X X X X [1,9] |
| 00:00:30 | X X X X X X [5,D] |
| 00:00:35 | X X X X X X [3,B] |
| 00:00:40 | X X X X X X [7,F] |
| 00:00:45 | X X X X X X [0,8] (retry) |
| 00:00:50 | X X X X X X [4,C] (retry) |
| | X=4 |
| 00:00:05 | X X X X X X [0] |
| 00:00:10 | X X X X X X [8] |
| 00:00:15 | X X X X X X [4] |
| 00:00:20 | X X X X X X [C] |
| 00:00:25 | X X X X X X [2] |
| 00:00:30 | X X X X X X [A] |
| 00:00:35 | X X X X X X [6] |
| 00:00:40 | X X X X X X [E] |
| 00:00:45 | X X X X X X [1] |
| 00:00:50 | X X X X X X [9] |
| 00:00:55 | X X X X X X [5] |
| 00:01:00 | X X X X X X [D] |
| 00:01:05 | X X X X X X [3] |
| 00:01:10 | X X X X X X [B] |
| 00:01:15 | X X X X X X [7] |
| 00:01:20 | X X X X X X [F] |
| 00:01:25 | X X X X X X [0] (retry) |
| 00:01:30 | X X X X X X [8] (retry) |
| | X=5 |
| 00:00:05 | X X X X X [0,8,4,C,2,A,6,E] 0 |
| 00:00:10 | X X X X X [1,9,5,D,3,B,7,F] 0 |
| 00:00:15 | X X X X X [0,8,4,C,2,A,6,E] 8 |
| 00:00:20 | X X X X X [1,9,5,D,3,B,7,F] 8 |
| 00:00:25 | X X X X X [0,8,4,C,2,A,6,E] 4 |
| 00:00:30 | X X X X X [1,9,5,D,3,B,7,F] 4 |
| 00:00:35 | X X X X X [0,8,4,C,2,A,6,E] C |
| 00:00:40 | X X X X X [1,9,5,D,3,B,7,F] C |
| . | . |
| | X=6 |
| 00:00:05 | X X X X X [0,8,4,C] 0 |

-continued

| ELAPSED TIME | DIGITAL ADDRESS |
|---|---|
| 00:00:10 | X X X X X [2,6,A,E] 0 |
| 00:00:15 | X X X X X [1,9,5,D] 0 |
| 00:00:20 | X X X X X [3,B,7,F] 0 |
| 00:00:25 | X X X X X [0,8,4,C] 8 |
| 00:00:30 | X X X X X [2,6,A,E] 8 |
| 00:00:35 | X X X X X [1,9,5,D] 8 |
| 00:00:40 | X X X X X [3,7,B,F] 8 |
| . | . |
| | X=7 |
| 00:00:05 | X X X X X [0,8] 0 |
| 00:00:10 | X X X X X [4,C] 0 |
| 00:00:15 | X X X X X [2,6] 0 |
| 00:00:20 | X X X X X [A,E] 0 |
| 00:00:25 | X X X X X [1,9] 0 |
| 00:00:30 | X X X X X [5,D] 0 |
| 00:00:35 | X X X X X [3,B] 0 |
| 00:00:40 | X X X X X [7,F] 0 |
| . | . |
| | X=8 |
| 00:00:05 | X X X X X [0] 0 |
| 00:00:10 | X X X X X [8] 0 |
| 00:00:15 | X X X X X [4] 0 |
| 00:00:20 | X X X X X [C] 0 |
| 00:00:25 | X X X X X [2] 0 |
| 00:00:30 | X X X X X [A] 0 |
| 00:00:35 | X X X X X [6] 0 |
| 00:00:40 | X X X X X [E] 0 |
| . | . |
| | X=9 |
| 00:00:05 | X X X X [0,8,4,C,2,A,6,E] 0 0 |
| 00:00:10 | X X X X [1,9,5,D,3,B,7,F] 0 0 |
| 00:00:15 | X X X X [0,8,4,C,2,A,6,E] 8 0 |
| 00:00:20 | X X X X [1,9,5,D,3,B,7,F] 8 0 |
| 00:00:25 | X X X X [0,8,4,C,2,A,6,E] 4 0 |
| 00:00:30 | X X X X [1,9,5,D,3,B,7,F] 4 0 |
| 00:00:35 | X X X X [0,8,4,C,2,A,6,E] C 0 |
| 00:00:40 | X X X X [1,9,5,D,3,B,7,F] C 0 |
| . | . |
| | X=A |
| 00:00:05 | X X X X [0,8,4,C] 0 0 |
| 00:00:10 | X X X X [2,6,A,E] 0 0 |
| 00:00:15 | X X X X [1,9,5,D] 0 0 |
| 00:00:20 | X X X X [3,B,7,F] 0 0 |
| 00:00:25 | X X X X [0,8,4,C] 8 0 |
| 00:00:30 | X X X X [2,6,A,E] 8 0 |
| 00:00:35 | X X X X [1,9,5,D] 8 0 |
| 00:00:40 | X X X X [3,7,B,F] 8 0 |
| . | . |
| | X=B |
| 00:00:05 | X X X X [0,8] 0 0 |
| 00:00:10 | X X X X [4,C] 0 0 |
| 00:00:15 | X X X X [2,6] 0 0 |
| 00:00:20 | X X X X [A,E] 0 0 |
| 00:00:25 | X X X X [1,9] 0 0 |
| 00:00:30 | X X X X [5,D] 0 0 |
| 00:00:35 | X X X X [3,B] 0 0 |
| 00:00:40 | X X X X [7,F] 0 0 |
| . | . |
| | X=C |
| 00:00:05 | X X X X [0] 0 0 |
| 00:00:10 | X X X X [8] 0 0 |
| 00:00:15 | X X X X [4] 0 0 |
| 00:00:20 | X X X X [C] 0 0 |
| 00:00:25 | X X X X [2] 0 0 |
| 00:00:30 | X X X X [A] 0 0 |
| 00:00:35 | X X X X [6] 0 0 |
| 00:00:40 | X X X X [E] 0 0 |
| . | . |
| | X=D |
| 00:00:05 | X X X [0,8,4,C,2,A,6,E] 0 0 0 |
| 00:00:10 | X X X [1,9,5,D,3,B,7,F] 0 0 0 |
| 00:00:15 | X X X [0,8,4,C,2,A,6,E] 8 0 0 |

-continued

| ELAPSED TIME | DIGITAL ADDRESS |
|---|---|
| 00:00:20 | X X X [1,9,5,D,3,B,7,F] 8 0 0 |
| 00:00:25 | X X X [0,8,4,C,2,A,6,E] 4 0 0 |
| 00:00:30 | X X X [1,9,5,D,3,B,7,F] 4 0 0 |
| 00:00:35 | X X X [0,8,4,C,2,A,6,E] C 0 0 |
| 00:00:40 | X X X [1,9,5,D,3,B,7,F] C 0 0 |
| . | . |
| . | . |
| | X=E |
| 00:00:05 | X X X [0,8,4,C] 0 0 0 |
| 00:00:10 | X X X [2,6,A,E] 0 0 0 |
| 00:00:15 | X X X [1,9,5,D] 0 0 0 |
| 00:00:20 | X X X [3,B,7,F] 0 0 0 |
| 00:00:25 | X X X [0,8,4,C] 8 0 0 |
| 00:00:30 | X X X [2,6,A,E] 8 0 0 |
| 00:00:35 | X X X [1,9,5,D] 8 0 0 |
| 00:00:40 | X X X [3,7,B,F] 8 0 0 |
| . | . |
| . | . |
| | X=F |
| 00:00:05 | X X X [0,8] 0 0 0 |
| 00:00:10 | X X X [4,C] 0 0 0 |
| 00:00:15 | X X X [2,6] 0 0 0 |
| 00:00:20 | X X X [A,E] 0 0 0 |
| 00:00:25 | X X X [1,9] 0 0 0 |
| 00:00:30 | X X X [5,D] 0 0 0 |
| 00:00:35 | X X X [3,B] 0 0 0 |
| 00:00:40 | X X X [7,F] 0 0 0 |
| . | . |
| . | . |

We claim:

1. A method of dynamically controlling the transfer of stored data from a plurality of remote units to a central location over a communication network, said central location capable of processing a fixed number of successful data transfers from said plurality of remote units, the method comprising the steps of:
   (a) prompting each of said plurality of remote units to attempt to transfer stored data to said central location at a random time within a callback time period of a predetermined length;
   (b) monitoring the number of successful transfers of stored data from said plurality of remote units to said central location over said communication network; and
   (c) dynamically controlling the length of the callback time period during such period in response to the monitored number of successful data transfers.

2. The method according to claim 1 further comprising the step of:
   (d) prompting remote units which unsuccessfully attempt to transfer stored data to said central location to attempt to transfer stored data after a time interval equal to the callback time period has elapsed from the last unsuccessful transfer attempt.

3. The method according to claim 2 wherein the length of the callback time period is increased if the monitored number of successful data transfers is approximately equal to the fixed number of successful data transfers capable of being processed by said central location.

4. The method according to claim 3 wherein the length of the callback time period is increased until the monitored number of successful data transfers is less than the fixed number of successful data transfer capable of being processed by said central location.

5. The method according to claim 2 wherein the length of the callback time period is decreased if the monitored number of successful data transfers is less than the fixed number of successful data transfers capable of being processed by said central location.

6. The method according to claim 5 wherein the length of the callback time period is decreased until the monitored number of successful data transfers is approximately equal to the fixed number of successful data transfers capable of being processed by said central location.

7. The method according to claim 4 wherein after the length of the callback time period has been increased until the monitored number of successful data transfer is less than the fixed number of successful data transfers capable of being processed by said central location, the length of the callback time period is decreased until the monitored number of successful data transfer is approximately equal to the number of successful data transfers capable of being processed by said central location.

8. The method according to claim 1 wherein said communication network comprises a telephone network.

9. The method according to claim 1 wherein the length of the callback time period is controlled so as to generate a number of successful data transfers approximately equal to the fixed number of successful data transfers capable of being processed by said central location.

10. The method according to claim 1 wherein said remote units are prompted so as to generate a uniform distribution of attempts to transfer stored data within the callback time period.

11. A method of dynamically controlling the transfer of stored billing information from a plurality of modules in an impulse pay-per-view system to a headend over a telephone network, each module in said impulse pay-per-view system having a digital identifier comprising a plurality of bits arranged in a predetermined order, said method comprising the steps of:
   (a) prompting each of said plurality of modules to transfer stored billing information to the headend at a random time within a callback time period of a predetermined length:
   (b) monitoring the number of successful transfers of stored billing information from said plurality of modules to said headend over said telephone network; and
   (c) dynamically controlling the length of the callback time period during such period in response to the monitored number of successful billing information transfers.

12. The method according to claim 11 wherein said plurality of modules are prompted so as to generate a uniform distribution of attempts to transfer billing information within the callback time period.

13. The method according to claim 12 wherein the uniform distribution is generating using the digital identifiers of said plurality of modules.

14. The method according to claim 13 wherein the uniform distribution is generated so that modules having consecutive digital identifiers attempt to transfer billing information at spaced times during the callback time period.

15. The method according to claim 11 further comprising the step of:
   (d) prompting modules which unsuccessfully attempt to transfer billing information to said headed to attempt to transfer stored billing information after a time interval equal to the callback time period has elapsed from the last unsuccessful transfer attempt.

16. The method according to claim 15 wherein the length of the callback time period is decreased until the monitored number of successful billing information transfers is approximately equal to the number of successful billing information transfers capable of being processed by the headend.

17. The method according to claim 15 wherein the length of the callback time period is increased until the monitored number of successful billing information transfers is approximately equal to the number of successful billing information transfers capable of being processed by said headend.

18. The method according to claim 13 wherein the uniform distribution is generated by shifting the plurality of bits comprising the digital identifier of each of said modules in a predetermined manner.

19. The method according to claim 11 wherein the length of the callback time period is controlled so as to generate a number of successful billing information transfers approximately equal to the number of successful billing information transfers capable of being processed by said headend.

20. A method of dynamically controlling the transfer of stored data from a plurality of remote units to a central location over a communication network, the method of comprising the steps of:
  (a) prompting each of said plurality of remote units to attempt to transfer stored data to said central location within a callback time period of a predetermined length;
  (b) monitoring the number of successful transfers of stored data from said plurality of remote units to said central location; and
  (c) dynamically controlling the length of the callback time period during such period in response to the monitored number of successful data transfers.

21. The method according to claim 20 further comprising the step of:
  (d) prompting remote units which unsuccessfully attempt to transfer stored data to said central location to attempt to transfer stored data after a time interval equal to the callback time period has elapsed from the last unsuccessful transfer attempt.

22. The method according to claim 20 wherein said communication network comprises a telephone network.

23. The method according to claim 20 wherein the length of the callback time period is controlled so as to generate a number of successful data transfers approximately equal to the number of successful data transfers capable of being processed by said central location.

24. The method according to claim 20 wherein each of said plurality of remote units attempts to transfer stored data to said central location at a unique predetermined time within the callback time period.

25. The method according to claim 24 wherein the unique time associated with each remote is generated by shifting the bits of the associated digital identifier in a predetermined manner.

26. A data recovery system comprising:
  a plurality of remote units for storing data;
  a central location for receiving data transferred from said plurality of remote units;
  prompt means for prompting each of said plurality of remote units to attempt to transfer stored data to said central location within a time period of a predetermined length;
  wherein said remote units which unsuccessfully attempt to transfer stored data to said central location again attempt to transfer stored data after a time interval equal to the time period has elapsed from the last unsuccessful transfer attempt;
  monitoring means for monitoring the number os successful transfers of stored data from said remote units to said central location; and
  control means for dynamically controlling the length of the time period during such period in response to the monitored number of data transfers.

27. The data recovery system according to claim 26 wherein said central location is adapted to receive data transferred from said plurality of remote units over a telephone network.

28. The data recovery system according to claim 26 wherein said control means controls the length of the time period such that the number of successful data transfers is approximately equal to the number of successful data transfers capable of being processed by said central location.

29. The data recovery system according to claim 26 wherein said control means increases the length of the time period if the number of successful data transfers monitored by said monitoring means is approximately equal to the number of successful data transfers capable of being processed by said central location.

30. The data recovery system according to claim 26 wherein said control means decreases the length of the time period if the number of successful data transfers monitored by said monitoring means is less than the number of successful data transfers capable of being processed by said central location.

31. The data recovery system according to claim 29 wherein said control means increases the length of the time period until the number of successful data transfers monitored by said monitoring means is less than the number of successful data transfers capable of being processed by said central location.

32. The data recovery system according to claim 31 wherein after said control means has increased the length of the time period until the number of successful data transfers monitored by said monitoring means is less than the number of successful data transfers capable of being processed by said central location, said control means decreases the length of the time period until the number of successful data transfers monitored by said monitoring means is approximately equal to the number of successful data transfers capable of being processed by said central location.

33. Apparatus for dynamically controlling the transfer of stored data from a plurality of remote units to a central location over a communication network, said apparatus comprising:
  prompt means for prompting each of said plurality of remote units to attempt to transfer stored data to said central location within a time period of a predetermined length;
  wherein said remote units which unsuccessfully attempt to transfer stored data to said central location again attempt to transfer stored data after a time interval equal to the time period has elapsed from the last unsuccessful transfer attempt;
  monitoring means for monitoring the number of successful transfers of stored data from said plurality of remote units to said central location over said communication network; and control means for dynamically controlling the length of the time period during such period in response to the monitored number of successful data transfers.

34. The apparatus according to claim 33 wherein said communication network comprises a telephone network.

35. The apparatus according to claim 33 wherein said control means controls the length of the time period such that the number of successful data transfers is approximately equal to the number of successful data transfers capable of being processed by said central location.

36. The apparatus according to claim 33 wherein said control means increases the length of the time period if the number of successful data transfers monitored by said monitoring means is approximately equal to the number of successful data transfers capable of being processed by said central location.

37. The apparatus according to claim 33 wherein said control means decreases the length of the time period if the number of successful data transfers monitored by said monitoring means is less than the number of successful data transfers capable of being processed by said central location.

38. The apparatus according to claim 36 wherein said control means increases the length of the time period until the number of successful data transfers monitored by said monitoring means is less than the number of successful data transfer capable of being processed by said central location.

39. The apparatus according to claim 38 wherein after said control means has increased the length of the time period until the number of successful data transfers monitored by said monitoring means is less than the number of successful data transfers capable of being processed by said central location, said control means decreases the length of the time period until the number of successful data transfers monitored by said monitoring means is approximately equal to the number of successful data transfers capable of being processed by said central location.

40. An impulse pay-per-view system comprising:
a plurality of modules for storing billing information related to impulse pay-per-view transactions;
central receiving means for receiving billing information transferred from said plurality of modules over a communication network;
prompt means for prompting each of said plurality of modules to transfer stored billing information to said central receiving means within a time period of a predetermined length;
wherein said modules which unsuccessfully attempt to transfer stored billing information to said central receiving means again attempt to transfer stored billing information after a time interval equal to the time period has elapsed from the last unsuccessful transfer attempt;
monitoring means for monitoring the number of successful transfers of stored information from said modules to said central receiving means; and
control means for dynamically controlling the length of the time period during said period in response to the monitored number of billing information transfers.

41. The impulse pay-per-view system according to claim 40 wherein said central receiving means is adapted to receive billing information from said plurality of modules over a telephone network.

42. The impulse pay-per-view system according to claim 40 wherein said control means controls the length of the time period such that the number of successful billing information transfers is approximately equal to the number of successful billing information transfers capable of being processed by said central receiving means.

43. The impulse pay-per-view system according to claim 40 wherein said control means increases the length of the time period if the number of successful billing information transfer monitored by said monitoring means is approximately equal to the number of successful billing information transfers capable of being processed by said central receiving means.

44. The impulse pay-per-view system according to claim 40 wherein said control means decreases the length of the time period if the number of successful billing information transfers monitored by said monitoring means is less than the number of successful billing information transfers capable of being processed by said central receiving means.

45. The impulse pay-per-view system according to claim 43 wherein said control means increases the length of the time period until the number of successful billing information transfers monitored by said monitoring means is less than the number of successful billing information transfers capable of being processed by said central receiving means.

46. The impulse pay-per-view system according to claim 45 wherein after said control means has increased the length of the time period until the number of successful billing information transfers monitored by said monitoring means is less than the number of successful billing information transfers capable of being processed by said central receiving means, said control means decreases the length of the time period until the number of successful billing information transfers monitored by said monitoring means is approximately equal to the number of successful billing information transfers capable of being processed by said central receiving means.

* * * * *